(12) United States Patent
Yamashita et al.

(10) Patent No.: US 6,387,294 B1
(45) Date of Patent: May 14, 2002

(54) RARE EARTH RESIN MAGNET, MAGNET ROTOR, MAGNET MOTOR USING THE SAME, AND ITS MANUFACTURING METHOD

(75) Inventors: Fumitoshi Yamashita, Nara; Yoshikazu Yamagata; Hiromichi Fujimoto, both of Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/680,927

(22) Filed: Oct. 10, 2000

(30) Foreign Application Priority Data

Oct. 15, 1999 (JP) .............................. 11-293310

(51) Int. Cl.$^7$ ................................................ H01R 7/00
(52) U.S. Cl. ................................. 252/62.54; 252/62.55
(58) Field of Search ........................ 252/62.54, 62.55; 148/104

(56) References Cited

FOREIGN PATENT DOCUMENTS

| GB | XP-002178659 | 3/1982 |
|----|--------------|--------|
| JP | 58186348 | 10/1983 |
| JP | 62-196057 | 8/1987 |
| JP | 62-263612 | 11/1987 |
| JP | 04120162 | 4/1992 |
| JP | 5-47576 | 2/1993 |
| JP | 5-55021 | 3/1993 |
| JP | 5-299221 | 11/1993 |
| JP | 6-42409 | 6/1994 |
| JP | 6-87634 | 11/1994 |
| JP | 2528574 | 6/1996 |
| JP | 2766746 | 4/1998 |
| JP | 11283817 | 10/1999 |

Primary Examiner—C. Melissa Koslow
(74) Attorney, Agent, or Firm—McDermott, Will & Emery

(57) ABSTRACT

A magnet having a maximum energy product at 20° C. of 18 MGOe or more, and an extremely excellent magnetic performance is obtained. A magnet stable in the magnetic performance in practical temperature range is obtained. A magnet having an excellent recycling performance is obtained. A magnet motor using such rare earth resin magnet generates a potent static magnetic field in the space with the armature core. The motor output is enhanced, and the current consumption is lowered. The rare earth resin magnet comprises at least one resin of thermoplastic resin and thermoplastic elastomer, pentaerythritol stearic acid triester, and rare earth magnetic powder. The rare earth magnetic powder, resin, and pentaerythritol stearic acid triester form a mutually mixed resin magnet composition, and this resin magnet composition has a predetermined shape. A magnet rotor has this rare earth resin magnet. A magnet motor has this rare earth resin magnet, a rotor frame, an armature core, a winding, and a rotor, and the rare earth resin magnet has a ring shape, and this rare earth resin magnet of the ring shape is disposed in the inner periphery of the rotor frame.

21 Claims, 8 Drawing Sheets

US 6,387,294 B1

RARE EARTH RESIN MAGNET, MAGNET ROTOR, MAGNET MOTOR USING THE SAME, AND ITS MANUFACTURING METHOD

FIELD OF THE INVENTION

The present invention relates to rare earth resin magnet used in a motor, its magnet rotor, and a magnet motor using the same.

BACKGROUND OF THE INVENTION

FIG. 8 is a sectional structural view of an annular magnet motor having an output of several watts (W) or less. In FIG. 8, the magnet motor comprises a substrate 1, an armature core 2 having a plurality of salient poles, a drive winding 3 wound around each salient pole, a bearing 4, a rotary shaft 5, a rotor frame 6, and an annular magnet 7. The annular magnet 7 is affixed to the inner peripheral wall of the rotor frame 6. The annular magnet 7 has a multiplicity of magnetized poles.

This conventional annular magnet, and the conventional motor using such conventional magnet are explained below.

The annular magnet used in the conventional magnet motor was made from a flexible sheet-shaped bonded magnet. The flexible sheet-shaped bonded magnet is composed of a mixture of ferrite magnetic powder and rubber-like resin. The flexible sheet-shaped bonded magnet is cut in bands. The flexible sheet-shaped bonded magnet cut in bands is affixed to the inner peripheral wall of the rotor frame while being curled in a rink shape. The flexible sheet-shaped bonded magnet in a cut ring shape is disposed oppositely to the salient pole surface of the armature core. The ferrite magnetic powder is a fine metal oxide with a particle size of 3 μm or less, and the maximum energy product [BH] max. of the flexible sheet-shaped bonded magnet obtained from the ferrite magnetic powder and rubber-like resin is about 1.4 MGOe at a maximum limit. Therefore, since its magnetic force is small, the intensity of the magnetic field occurring in the space between the magnet and armature core was a relatively weak static magnetic field. Accordingly, if the flexible sheet-shaped bonded magnet containing the ferrite magnetic powder was cut in bands, the ferrite magnetic powder positioned at the cut section had little effects on the performance and reliability of the annular magnet motor. However, to satisfy the requirements for higher output and lower current consumption of the annular magnet motor, it is needed to form a potent static magnetic field in the mutually opposing space of the magnet and armature core. The magnet using such conventional ferrite magnetic powder could not build up a potent static magnetic field in the space between the magnet and armature core.

As a flexible sheet-shaped bonded magnet, a flexible sheet-shaped bonded magnet containing rare earth magnetic powder and rubber-like resin has been known.

Japanese Patent No. 2766746 (Japanese Laid-open Patent No. 5-55021) discloses a flexible sheet-shaped bonded magnet comprising a first group, a second group, and a third group. The first group include Nd—Fe—B magnetic powder and (Ce, La)—Fe—B magnetic powder. The second group includes natural rubber, isoprene rubber, butadiene rubber, styrene butadiene rubber, butyl rubber, ethylene propylene rubber, ethylene vinyl acetate rubber, nitrile rubber, acrylic rubber, and urethane rubber. The third group includes chloroprene rubber, polyethylene chlorosulfonide, and polyethylene chloride. In each group of the first group, second group, and third group, one or more materials are selected. The magnetic powder in the first group is contained in a range of 92 to 96 wt.%. The density of this flexible sheet-shaped bonded magnet 4.9 to 5.8 g/cm³. Such flexible sheet-shaped bonded magnet is cut in bands, and curled to a ring shape, and affixed to the inner peripheral wall of the rotor frame, so as to be opposite to the salient pole surface of the armature core. Such magnet motor has been known.

A manufacturing method of flexible sheet-shaped bonded magnet disclosed in Japanese Patent No. 2528574 (Japanese Laid-open Patent No. 5-47576) comprises (a) a step of kneading R—Fe—B (R being Nd/Pr) magnetic powder and binder, (b) a step of grinding the mixture and rolling into a sheet, and (c) a step of heating the rolled sheet of magnet material to 125 to 180° C. for 60 to 180 minutes.

However, the motor having such conventional flexible sheet-shaped bonded magnet involves the following problems (1), (2) and (3).

(1) Since the density of the flexible sheet-shaped bonded magnet is 4.9 to 5.8 g/cm³₁, there is a limit in the magnetic performance.

(2) The flexible binder and rare earth magnetic powder are not in mutually adhesive state, by nature. Accordingly, by the magnetic attracting force of an excited armature core, the rare earth magnetic powder drops out and scatters about. It hence causes rotation noise or rotation troubles. As a result, there is a problem in the motor reliability.

(3) The manufacturing process is complicated including the steps of processing the film by epoxy resin, overheating for vulcanizing the flexible binder, reheating the cut section, and affixing for eliminating failure in the cut section when affixing the flexible sheet-shaped bonded magnet to the rotor frame, and there is a problem in the reliability in the manufacturing process.

On the other hand, the following annular resin magnet has been known. Japanese Patent Publication No. 6-87634 (Japanese Laid-open Patent No. 62-196057) discloses an annular magnet motor using an annular resin magnet for producing a potent static magnetic field in the space opposite to the armature core. That is, the annular resin magnet includes isotropic R—Fe—B (R being Nd/Pr) magnetic powder and resin, with an outside diameter. of 25 mm or less. The density of the annular resin magnet ranges from about 5 g/cm³ to about 6.3 g/cm³, and resin magnet having a density exceeding 6.3 g/cm³ cannot be obtained. The maximum energy product [BH] max. of the annular magnet containing isotropic magnetic powder is 11 to 12 MGOe at a limit. By contrast, anisotropic magnetic powder declines in the degree of orientation of the magnetic powder as the diameter of the annular magnet becomes smaller. Accordingly, in the annular magnet motor using an annular magnet containing anisotropic magnetic powder, it was difficult to satisfy both smaller size and higher output.

For example, a flexible sheet-shaped bonded magnet containing Sr ferrite magnetic powder and rubber-like resin, and a molded annular magnet containing R—Fe—B (R being Nd/Pr) magnetic powder and binder were compared. The flexible sheet-shaped bonded magnet was cut in a band of 1.5 mm in thickness and 7.2 mm in width, and this band of flexible sheet-shaped bonded magnet curled, and affixed in a ring shape to the inner peripheral wall of a rotor frame of 22.5 mm in inside diameter. The starting torque of the annular magnet motor was 1.5 mN-m. By contrast, the molded annular magnet was compressed and molded to outside diameter of 22.5 mm, thickness of 1.10 mm, height of 9.4 mm, and density of 5.8 g/cm³₁, and the obtained molded annular magnet was affixed to the rotor frame. The starting torque of this annular magnet motor was 20 mN-m.

Japanese Patent Publication No. 6-42409 (Japanese Laid-open Patent No. 62-263612) discloses a bond magnet having isotropic Fe—B—R magnetic powder and binder. The binder comprises an oligomer having an alcoholic hydroxyl group in a molecular chain such as bisphenol type epoxy which is solid at room temperature, and an isocyanate regenerated form, so that the R—Fe—B (R being Nd/Pr) magnetic powder and binder are adhered and fixed to each other more firmly.

The isocyanate regenerated form is a compound obtained by adding an active hydrogen compound preliminarily to an isocyanate compound. By thermal dissociation, the isocyanate regenerated form releases isocyanate group, and the free isocyanate group reacts with an alcoholic hydroxyl group, and crosslinks by urethane bonding or the like. At this time, part of the free isocyanate group reacts with adsorbed water on the metal surface such as R—Fe—B (R being Nd/Pr) magnetic powder, and produces a urea substituent. This urea substituent produces chelate bond with a metal oxide surface layer. It hence prevents dropping or scattering of magnetic powder contained in the bonded magnet, and the performance and reliability of the annular magnet motor using such bonded magnet are assured.

Therefore, such isotropic molded annular magnet is the most effective prior art for higher output and lower current consumption of a small annular magnet motor. Generally, due to limit of design in the magnetic field forming method, it is difficult to manufacture an annular molded magnetic having a small diameter. In the manufacturing method of small annular magnet, there is a limit in the intensity of magnetic field generated in the radial direction. That is, the limit value of intensity of the magnetic field generated in the radial direction is extremely smaller than the limit value of intensity of the magnetic field generated in the axial direction. Besides, since the isotropic R—Fe—B resin magnet is limited in the content of the magnetic powder contained in the resin magnet or in the density of resin magnet, the magnetic performance of the resin magnet has its upper limit, and the magnetic performance is limited. The magnetic powder contained in such resin magnet is adhered and fixed firmly by a thermosetting binder, its recycling is difficult.

Japanese Laid-open Patent No. 5-299221 discloses a small motor using a cut-off flexible sheet-shaped bonded magnet containing rare earth-iron-nitrogen magnetic powder and styrene elastomer denatured by acid. That is, rare earth-iron-nitrogen magnetic powder and styrene elastomer denatured by acid are kneaded and rolled, and cut in short strips. The short strip is curled, and an annular magnet is formed. This annular magnet is used in the small motor. The density of this annular magnet is 5.6 g/cm³, and the maximum energy product [BH] max. is 4.4 MGOe. This flexible sheet-shaped bonded magnet containing rare earth-iron-nitrogen magnetic powder is inferior in the magnetic performance to the annular resin magnet containing isotropic R—Fe—B (R being Nd/Pr) magnetic powder and binder (density 6.2 to 6.3 g/cm³, maximum energy density [BH] max. 11 to 12 MGOe). Therefore, the motor using the flexible sheet-shaped bonded magnet containing rare earth-iron-nitrogen magnetic powder cannot obtain a potent static magnetic field in the gap against the armature core.

The rare earth-iron-nitrogen magnetic powder of Pining type is a fine powder having a single phase of $Sm_2Fe_{17}N_3$ magnetic phase of several μm. Accordingly, the Pining type magnetic powder is chemically active. Hence the rare earth-iron-nitrogen magnetic powder is exposed to the atmosphere at the cut section of the flexible sheet-shaped bonded magnet, and permanent demagnetization due to oxidation and corrosion takes place. Further, the adhesion between the magnetic powder and styrene elastomer is lowered, and dropping and scattering of magnetic powder occur.

SUMMARY OF THE INVENTION

A rare earth resin magnet of the invention comprises at least one resin of thermoplastic resin and thermoplastic elastomer, pentaerythritol stearic acid triester, and rare earth magnetic powder, in which the rare earth magnetic powder, the resin and the pentaerthritol stearic acid triester form a mutually mixed resin magnet composition, and the resin magnet composition has a specific shape.

A magnet rotor of the invention has the rare earth resin magnet.

A magnet motor of the invention comprises the above-mentioned rare resin magnet, a rotor frame, an armature core, a winding, and a rotor, in which the rare earth resin magnet has a ring shape, and the rare earth resin magnet of the ring shape is installed in the inner periphery of the rotor frame.

A manufacturing method of rare earth resin magnet of the invention comprises:

(a) a step of forming a mixture containing at least one resin of thermoplastic resin and thermoplastic elastomer, rare earth magnetic powder, and pentaerythritol stearic acid triester, and (b) a step of forming a resin magnet molded element having a specific shape from the mixture.

Preferably, in 100 parts by weight of the resin, the pentaerythritol stearic acid triester is contained by 2 parts by weight or more.

Preferably, the rare earth magnetic powder is dispersed in the resin, and oriented in a specific direction by magnetic field orientation.

Preferably, the specific shape is a shape formed from a hot-processed resin magnet molded element.

This constitution brings about the following effects.

In a rare earth resin magnet using thermoplastic resin or thermoplastic elastomer, a rare earth resin magnet capable of enhancing the filling rate of rare earth magnetic powder is presented. It also presents a rare earth resin magnet capable of enhancing the degree of orientation of rare earth magnetic powder contained in the magnetically oriented resin magnet. It further presents a rare earth resin magnet having a magnetic performance equivalent or superior to the magnetic performance of the rare earth resin magnetic using thermosetting resin. A magnet having an extremely excellent magnetic performance is obtained. A magnet stable in the magnetic performance in a practical temperature range is obtained. A magnet having an excellent recycling property is obtained. Moreover, a magnet rotor using such rare earth resin magnet can generate a potent static magnetic field in the gap with the armature core. It presents a magnet rotor excellent in recycling performance. In a motor using such magnet rotor, the output is heightened and the current consumption is lowered.

REFERENCE NUMERALS

Figure 1:
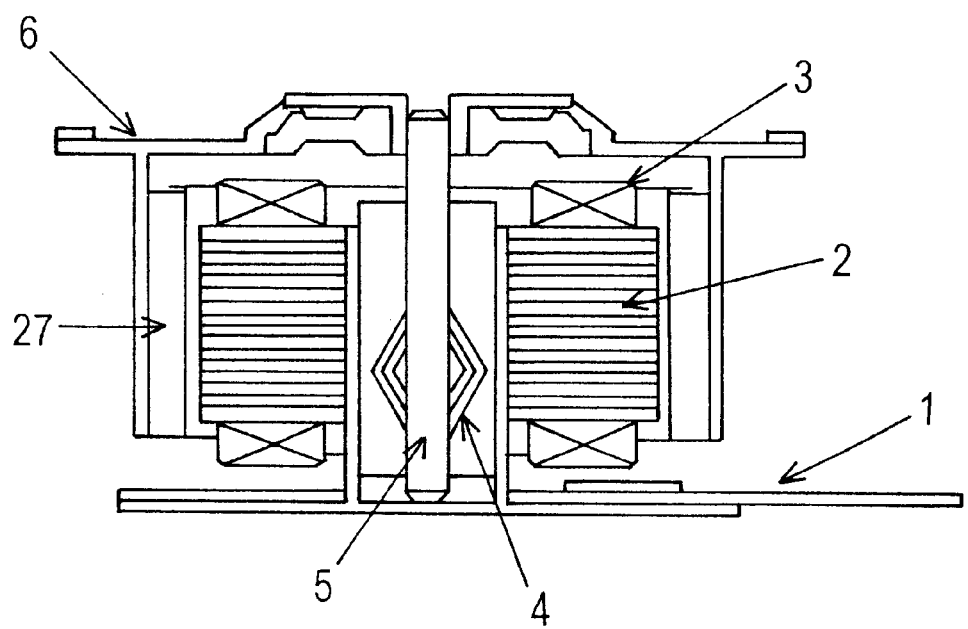
FIG. 1 is a block diagram of a magnet motor using a rare earth resin magnet in an embodiment of the invention.

1 Substrate
2 Armature core
3, Winding
4 Bearing
5 Rotary shaft
6 Rotor frame, stator
7 Magnet

DETAILED DESCRIPTION OF THE INVENTION

A rare earth resin magnet of the invention comprises at least one resin of thermoplastic resin and thermoplastic elastomer, pentaerythritol stearic acid triester, and rare earth magnetic powder, in which the rare earth magnetic powder, the resin and the pentaerythritol stearic acid triester form a mutually mixed resin magnet composition, and the resin magnet composition has a specific shape.

Preferably, in 100 parts by weight of the resin, the pentaerythritol stearic acid triester is contained by 2 parts by weight or more.

Preferably, the rare earth magnetic powder is dispersed in the resin, and oriented in a specific direction.

Preferably, the specific shape is a shape formed from a hot-processed resin magnet molded element.

Preferably, the resin magnet molded element has the rare earth magnetic powder oriented in a specific direction by magnetic field orientation of the resin magnet composition.

Preferably, the number of carbon atoms is 17 or more in the fatty acid residue of the pentaerythritol stearic acid triester compound.

Preferably, the rare earth magnetic powder is a thin piece formed by melt-spun of R—Fe—B (R being Nd/Pr) molten alloy.

Preferably, the rare earth magnetic powder has R—Fe—B (R being Nd/Pr) rare earth magnetic powder prepared by at least on method of die upsetting and hydrogen decomposition/recrystallization.

Preferably, the R—Fe—B (R being Nd/Pr) rare earth magnetic powder has coercivity HCi of 14 kOe or more at 20° C.

Preferably, the thermoplastic resin is polyamide-12.

Preferably, the thermoplastic resin is polyamide-12, and the content of the rare earth magnetic powder contained in the resin magnet composition is 96 wt.% at maximum.

Preferably, the thermoplastic elastomer is perfect thermoplastic polyurethane elastomer.

Preferably, the thermoplastic elastomer is perfect thermoplastic polyurethane elastomer, and the content of the rare earth magnetic powder contained in the resin magnet composition is 94 wt.% at maximum.

Preferably, the resin magnet molded element has a percentage of inner voids of 2 vol.% or less.

Preferably, the resin magnet composition has a ring shape.

Preferably, the resin magnet composition is flexible, and is curled to a ring shape.

A rare earth resin magnet of the invention contains thermoplastic resin or elastomer, rare earth magnetic powder, and pentaerythritol stearic acid triester as essential ingredients. A mixture containing these materials is molded by hot processing such as injection molding, extrusion molding, or calender processing, and a rare earth resin magnet is obtained. The pentaerythritol stearic acid triester provides both external activity and internal activity effects at the time of hot processing.

A magnet rotor of the invention has a rotor frame and an annular magnet disposed in the rotor frame, and the annular magnet is a rare earth resin magnet containing the pentaerythritol stearic acid triester.

A manufacturing method of annular magnet comprises (a) a step of forming a mixture containing at least one of thermoplastic resin and elastomer, rare earth magnetic powder, and pentaerythritol stearic acid triester, and (b) a step of forming an annular magnet from the mixture.

Preferably, the step of forming an annular magnet from the mixture includes a step of forming a flexible sheet-shaped bonded magnet from the mixture, a step of forming a magnet molded element having a final shape from the flexible sheet-shaped bonded magnet, and a step of forming an annular magnet by curling the magnet molded element.

Preferably, the step of forming a magnet molded element having a final shape includes a step of melting and solidifying the cut-off flexible sheet-shaped bonded magnet while applying a magnetic field in a molding die.

Preferably, the step of forming an annular magnet from the mixture includes a step of forming the annular magnet directly from the mixture.

A manufacturing method of magnet motor of the invention comprises a step of installing a rare earth resin magnet in a rotor frame.

Preferably, this step includes a step of forming an annular magnet by curling a flexible sheet-shaped bonded magnet molded element to the rotor frame. Or, this step includes a step of forming an annular magnet by filing a magnet slot directly with the mixture by using a magnet slot of rotor core as a molding cavity.

In such constitution, there is a very low risk of direct exposure of the rare earth magnetic powder contained in the rare earth resin magnet to the atmosphere. Accordingly, oxidation and corrosion of the rare earth resin magnet are prevented, and permanent demagnetization by oxidation and corrosion can be avoided. Further, dropping and scattering of rare earth magnetic powder contained in the rare earth resin magnet can be prevented. As a result, the reliability of the magnet rotor is enhanced.

As the thermoplastic resin, 12-nylon (polyamide-12) is preferred. As the elastomer, thermoplastic polyurethane elastomer is preferred. The thermoplastic polyurethane elastomer is a linear polymer produced from a compound having a bifunctional active hydrogen (for example, polyester) and total reaction type isocyanate group. This kind of thermoplastic elastomer usually exists in pellet form. The pellet size is powder of 40-mesh size or less. Polyurethane elastomer is classified into perfect thermoplastic elastomer and imperfect thermoplastic elastomer. The perfect thermoplastic elastomer has a smaller moisture absorbing property than the imperfect thermoplastic elastomer. The perfect thermoplastic elastomer hence does not require post-curing for completing the reaction after molding. Further, the perfect thermoplastic elastomer has an excellent recycling performance.

As the rare earth magnetic powder dispersed in the thermoplastic elastomer, rare earth-cobalt magnetic powder such as 1-5SmCo or 2-17SmCo system, or rare earth-iron nitride magnetic powder such as 2-17-3SmFeN may be used. In consideration of the resource balance in alloy composition of rare earth element and transition metal element, intrinsic magnetic potential of magnetic powder, and suitability to magnet motor, the melt-spun of molten alloy of rare earth-iron system, or R—Fe—B (R being Nd/Pr) magnetic powder processed by hydrogen decomposition/recrystallization (HDDR) is particularly preferred as the rare earth magnetic powder.

For example, the following examples of rare earth magnetic powder are particularly preferred.

(a) Isotropic rare earth magnetic powder disclosed in J. F. Herbest, "Rare Earth-Iron-Boron-Materials; A New Era in Permanent Magnets" Ann. Rev. Sci. Vol. 16, 1986. This isotropic rare earth magnetic powder is manufactured in a step of melt-spun of molten alloy containing Nd: Fe: B nearly at a rate of 2: 14: 1, and a step of depositionof Nd2Fe14B phase of crystal particle size of 20 to 50 nm by proper heat treatment. The remanence "Ir" is about 8 kG, and the coercivity "$H_{ci}$" is $H_{ci} \geq 8$ kOe.

(b) Anisotropic magnetic powder disclosed in R. Nakayama, T. Takeshita, et al., "Magnetic properties and microstructures of Nd—Fe—B magnet powder produced by hydrogen treatment," J. Appl. Phys. 70 (7), 1991. This anisotropic magnetic powder is manufactured by hydrogen decomposition/recrystallization (HDDR) process. The alloy composition of this anisotropic magnetic: powder is $Nd_{12.3}Dy_{0.3}Fe_{64.7}Co_{12.3}B_{6.0}Ga_{0.6}Zr_{0.1}$. In this alloy, for example, the Dy content is 0.25 at. % or more. The remanence "Ir" is Ir$\geq$11.5 kG, and the coercivity "$H_{ci}$" is $H_{ci}$24 14 kOe.

One kind or two or more kinds of these magnetic powder materials are dispersed in the thermoplastic elastomer at a high filling density. The magnetic powder is magnetically oriented, and fixed in the thermoplastic elastomer. Thus, an anisotropic flexible magnet is formed. The maximum energy product [BH] max. of this magnet is 18 MGOe or more. This flexible magnet is curled to a ring shape and installed in the rotor frame. In this manner, the annular magnet motor of the embodiment is prepared.

On the other hand, conforming to Japanese Patent Publication No. 6-87634, a conventional annular resin magnet is prepared by using isotropic R—Fe—B (R being Nd/Pr) magnetic powder and binder. The density of this conventional annular resin magnet is 5g/cm$^3$ or more. Using this annular resin magnet, a conventional annular magnet motor is manufactured. The outside diameter of this conventional annular magnet motor is 25 mm or less. The annular magnet motor using the flexible magnet of the embodiment can generate a static magnetic field of 140 to 150% stronger in the voids as compared with the annular magnet motor using the conventional annular resin magnet. Therefore, the annular magnet motor of the embodiment is heightened in the output and lowered in the current consumption of the magnet motor.

The pentaerythritol stearic acid triester has a chemical structure as shown in chemical formula 1, and is obtained by esterification reaction of pentaerythritol of one mole and higher fatty acid of three holes. The number of carbon atoms of the fatty acid residue contained in this chemical structure is preferred to be 17 or more. As the number of carbon atoms in the stearic acid ester increases, the heat-resisting temperature becomes higher. Hot processing of thermoplastic resin or thermoplastic elastomer and rare earth magnetic power requires a high temperature of over 200° C. Therefore, the pentaerythritol stearic acid triester having 17 or more carbon atoms can withstand the processing temperature of more than 200° C.

(Chemical formula 1)

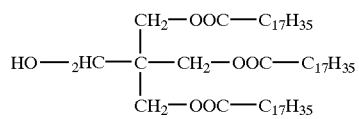

Such pentaerythritol stearic acid triester has a chemical structure consisting of three fatty acid residues with 17 or more carbon atoms and one alcoholic hydroxyl group. Therefore, at the time of hot processing of the resin composition containing rare earth magnetic powder, the materials are stabilized by physical actions of decreasing friction with the inside of these materials, processing machines and molding die. This pentaerythritol stearic acid triester acts as a lubricant. As the lubricant, generally, hydrocarbon, fatty acid amide, fatty acid ester, higher alcohol, fatty acid (stearic acid), and fatty acid metal salt are known.

However, the fatty acid (stearic acid) and fatty acid metal salt do not act as an excellent lubricant in the resin composition containing rare earth magnetic powder. By addition of such fatty acid or fatty acid metal salt, the effect of increasing the filling amount of rare earth magnetic powder was not recognized. Lubricants are classified into a lubricant having a functionally strong internal activity, and a lubricant having a potent external activity. In the mixture of rare earth magnetic powder and resin, the pentaerythritol stearic acid triester has been found to have both effects of internal activity and external activity. In particular, by the use of pentaerythritol stearic acid triester, the following effects are obtained.

(1) The melt viscosity is not lowered, (2) the flowage of material is increased in hot processing, and (3) the magnetic orientation of anisotropic rare earth magnetic powder is improved by application of magnetic field.

Therefore, while suppressing decline of mechanical strength of rare earth resin magnet, the filling density of rare earth magnetic powder is increased, the rare earth magnetic power is more easily oriented magnetically, and the magnetic performance of the rare earth resin magnet is enhanced.

Exemplary Embodiment

An exemplary embodiment of the invention is described below. It must be noted however that the invention is not limited to the illustrated exemplary embodiment alone.

The structure of a magnet motor-in an embodiment of the invention is shown in FIG. 1. In FIG. 1, the magnet motor comprises a substrate 1, an armature core 2, a drive winding 3, a bearing 4, a rotary shaft 5, a rotor frame 6, and a flexible magnet 27. The armature core 2 is fixed on the substrate 1. The armature core 2 has a plurality of salient poles and a central hole. The rotary shaft 5 is rotatably supported by the bearing 4. The upper end of the rotary shaft 5 projects from the armature core 2, and this upper end of the rotary shaft 5 is affixed in the central hole of the rotary frame 6. The rotary frame 6 surrounds the armature core 2. The flexible magnet 27 has a finally molded shape with no cut section. The molded flexible magnet 27 is curled and affixed to the inner peripheral wall of the rotor frame 6. That is, without being cut off, the molded flexible magnet 27 is curled and disposed in the inner periphery of the rotor frame 6. The magnet 27 has a multiplicity of magnetized poles.

(a) Rare earth magnetic powder

By melt-spun of molten alloy of alloy composition $Nd_{12}Fe_{77}Co_5B_6$, a crystallized isotropic magnetic alloy "A" was manufactured. In this isotropic R—Fe—B (R being Nd/Pr) magnetic powder "A", the remanence Ir at 20° C. was 8.2 kG, and the coercivity HCi was 9.4 kOe.

On the other hand, by hydrogen decomposition/recrystallization of alloy compositions, Nd—Dy—Fe—Co—B—Ga—Zr alloy and Nd—Fe—Co—B—Ga—Zr alloy, anisotropic R—Fe—B (R being Nd/Pr) magnetic powders "B1" to "B5" were manufactured. In these magnetic powders "B1" to "B5", the remanence Ir at 20° C. was 11.5 to 12.4 kG.

Figure 2:
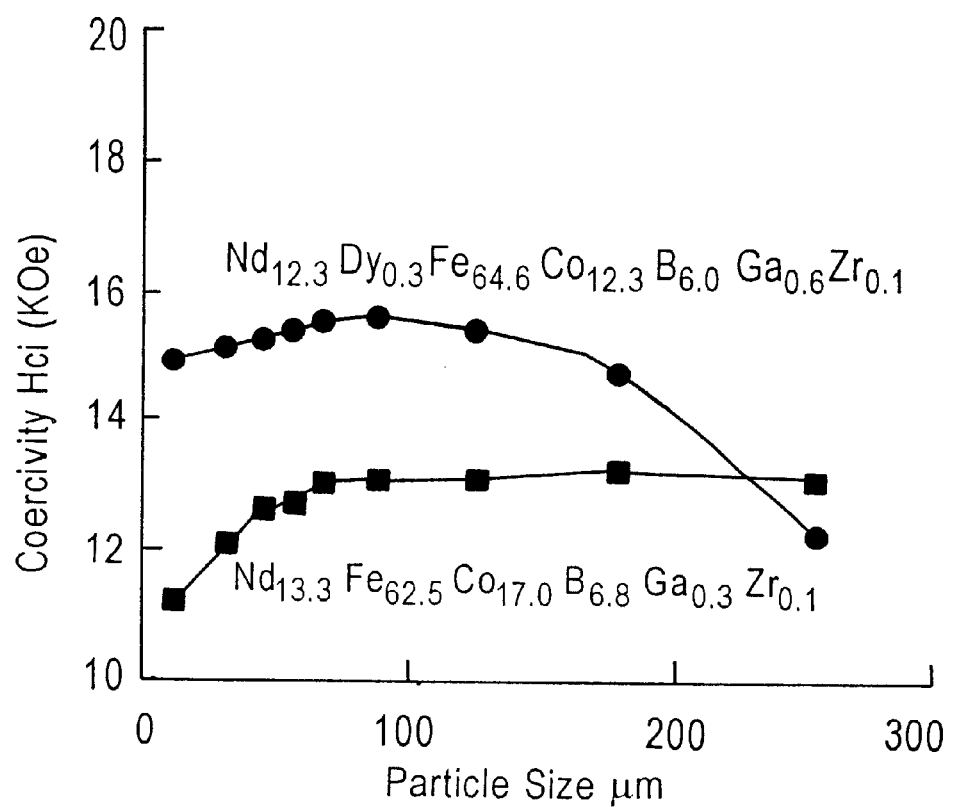
FIG. 2 is a characteristic diagram showing the relation between particle size and coercivity of rare earth magnetic powder used in the rare earth resin magnet in the embodiment of the invention.

FIG. 2 shows the relation between the powder particle size and coercivity "Hci" in the alloy compositions $Nd_{12.3}Dy_{0.3}Fe_{64.6}Co_{12.3}B_{6.0}Ga_{0.6}Zr_{0.1}$ and $Nd_{13.3}Fe_{62.5}Co_{17.0}B_{6.8}Ga_{0.3}Zr_{0.1}$. In the alloy "B1" and alloy "B2" not containing Dy, the coercivity "Hci" is low. In particular, when the particle size of the alloy powder is 100 μm or less, drop of the coercivity "Hci" is significant.

Figure 3:
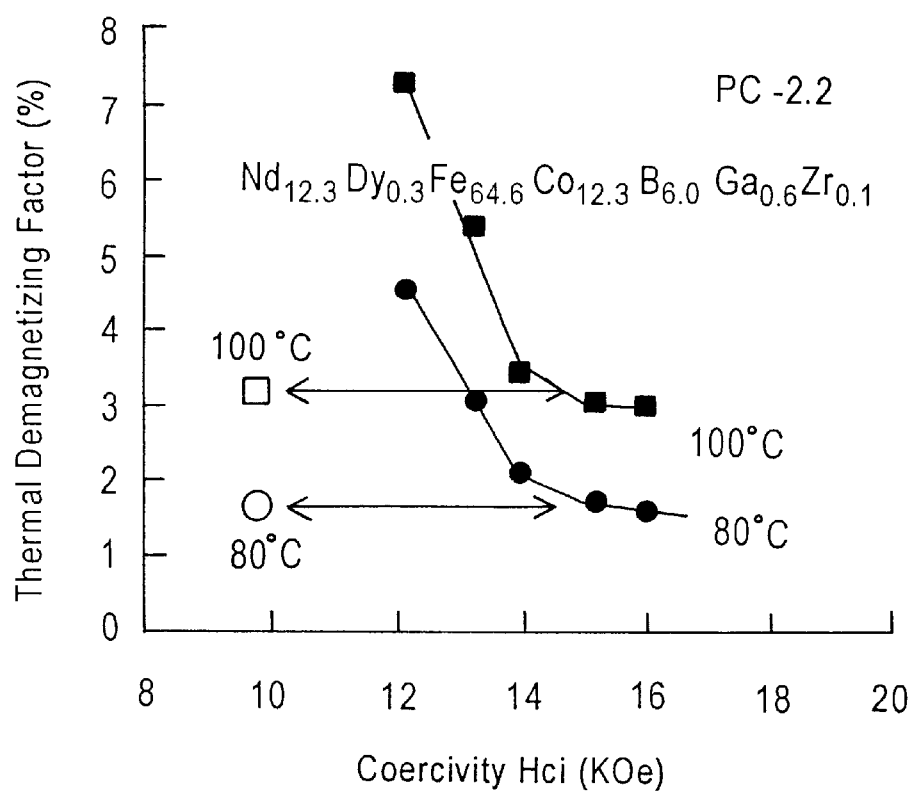
FIG. 3 is a characteristic diagram showing the relation between coercivity and irreversible demagnetizing factor of the rare earth resin magnet in the embodiment of the invention.

FIG. 3 shows the relation between the coercivity "Hci" and irreversible demagnetizing factor at 80° C. or 100° C.×1 hr in the Pc-2.2 flexible magnet with outside diameter of 5 mm. In order that the anisotropic R—Fe—B (R being Nd/Pr) magnetic powders "B1" to "B5" may have the same irreversible demagnetizing factor as the isotropic R—Fe—B (R being Nd/Pr) magnetic powder "A", at least, an alloy composition containing Dy is needed, and the coercivity "Hci" at 20° C. is required to be 14 kOe or more.

(b) Improving effect of flowage of resin magnet composition containing rare earth magnetic powder:

The R—Fe—B (R being Nd/Pr) isotropic rare earth magnetic powder "A", and anisotropic rare earth magnetic powders "B1" to "B5" were roughly ground to 105 μm or less in a nitrogen atmosphere. The specific surface area of the rare earth magnetic powder "A" was 0.05 to 0.07 g/m², and the specific surface area of the rare earth magnetic powers "B1" to "B5" was 0.08 to 0.09 g/m².

The rare earth magnetic powder "A"; 90 to 96 wt.%, and 12-nylon or thermoplastic polyurethane elastomer: 10 to 4 wt.% ground to 40-mesh or smaller size were weighed. In 100 parts by weight of 12-nylon or thermoplastic polyurethane elastomer, 0 to 14 parts by weight of 40-mesh or smaller pentaerythritol C17 triester (with 17 carbon atoms in fatty acid residue) is added. These materials are mixed in a Henschel mixer until homogenized. The mixture is kneaded and extruded by an extruder at the melting temperature of 210 to 230° C. The extruded molten strands are cut hot. Thus, the resin magnet composition in pellet form containing rare earth magnetic powder is obtained. In succession, 5 g of the resin magnet composition containing rare earth magnetic powder was reheated to 220° C., and compressed with a force of 3 tons in this state, and the disc flow was measured.

Figure 4:
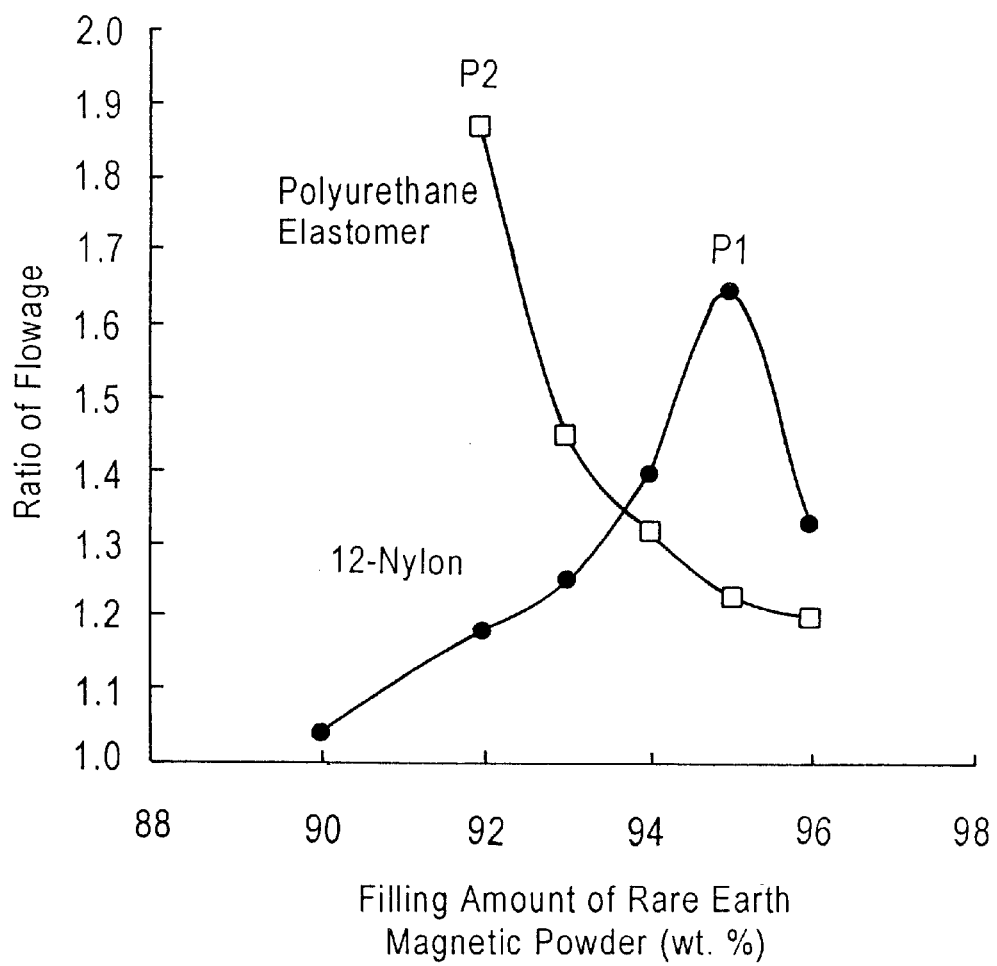
FIG. 4 is a characteristic diagram showing the relation between content and flowage of rare earth magnetic powder contained in the rare earth resin magnet.

FIG. 4 is a characteristic diagram showing the relation between content of rare earth magnetic powder and flowage of mixture, in a mixture containing rare earth magnetic powder "A", resin (polyurethane elastomer or 12-nylon), and pentaerythritol C17 triester. The axis of ordinates denotes the flowage ratio, and the axis of abscissas represents the content of rare earth magnetic powder contained in the mixture. In 100 parts by weight of 12-nylon or thermoplastic polyurethane elastomer, 10 parts by weight of pentaerythritol C17 triester is contained. The flowage ratio is a standardized value on the basis (1.0) of the flowage without addition of pentaerythiritol C17 triester.

As clear from FIG. 4, the flowage improving effect depends on the filling amount of the rare earth magnetic powder, and kind and specific gravity of the resin. For example, 12-nylon (specific gravity 1.1) is larger in volume ratio than thermoplastic polyurethane elastomer (specific gravity 1.23), and peak "P1" of flowage improvement of the mixture containing 12-nylon occurs near the filling amount of 95 wt.% of the rare earth magnetic powder. On the other hand, peak 2 of flowage improvement of the mixture containing thermoplastic polyurethane elastomer is estimated to be found at the filling amount of 92 wt.% or less of the rare earth magnetic powder. However, in the region of the filling amount of the rare earth magnetic powder in which the flowage declines significantly, the flowage improving effect of both mixtures is expressed obviously.

Figure 5:
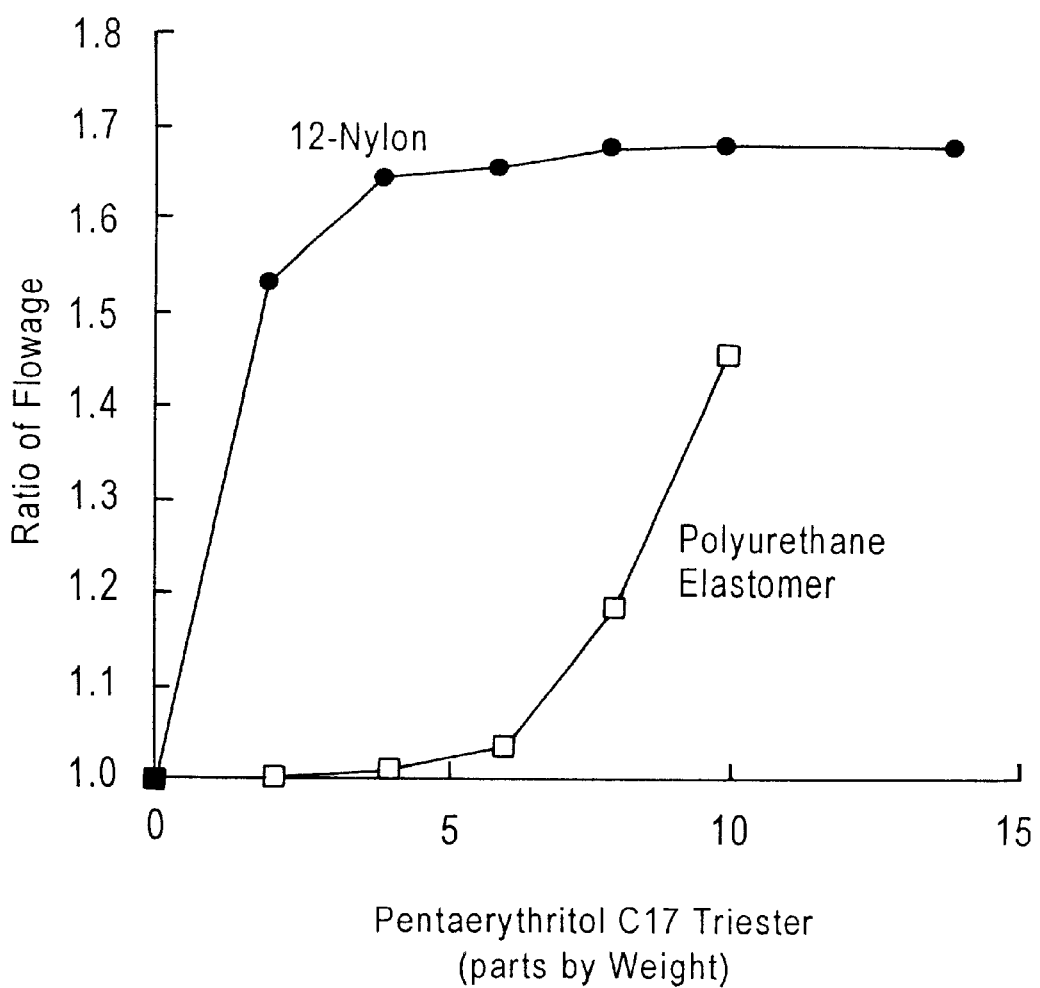
FIG. 5 is a characteristic diagram showing the relation between content and flowage of resin contained in the rare earth resin magnet.

FIG. 5 is a characteristic diagram showing the flowage ratio of the mixture in relation to the content of pentaerythritol C17 triester, in a resin composition containing rare earth magnetic powder "A". In FIG. 5, the filling amount of the rare earth magnetic powder "A" in the mixture containing 12-nylon is 95 wt.%, and the filling amount of the rare earth magnetic powder "A" in the mixture containing thermoplastic polyurethane elastomer is 93 wt.%.

As shown in FIG. 5, as clear from the comparison between 12-nylon and pentaerythritol C17 triester, the tendency of flowage improving effect by the content of pentaerythritol C17 triester depends on the kind and specific gravity of the resin, and does not coincide with the kind of the resin. However, in either mixture, in the mixture with the content of pentaerythritol C17 triester of 2 parts by weight, the flowage improving effect is expressed, and the flowage is improved by 140% or more in the mixture with the content of 10 parts by weight.

Incidentally, without addition of pentaerythritol C17 triester, the mixture containing fatty acid (stearic acid), powder of its metal salt (Zn, Ca, Al, Mg, Cu stearate), rare earth magnetic powder, and resin could not improve the flowage of the resin magnet composition containing rare earth magnetic powder by more than 120%.

Figure 6:
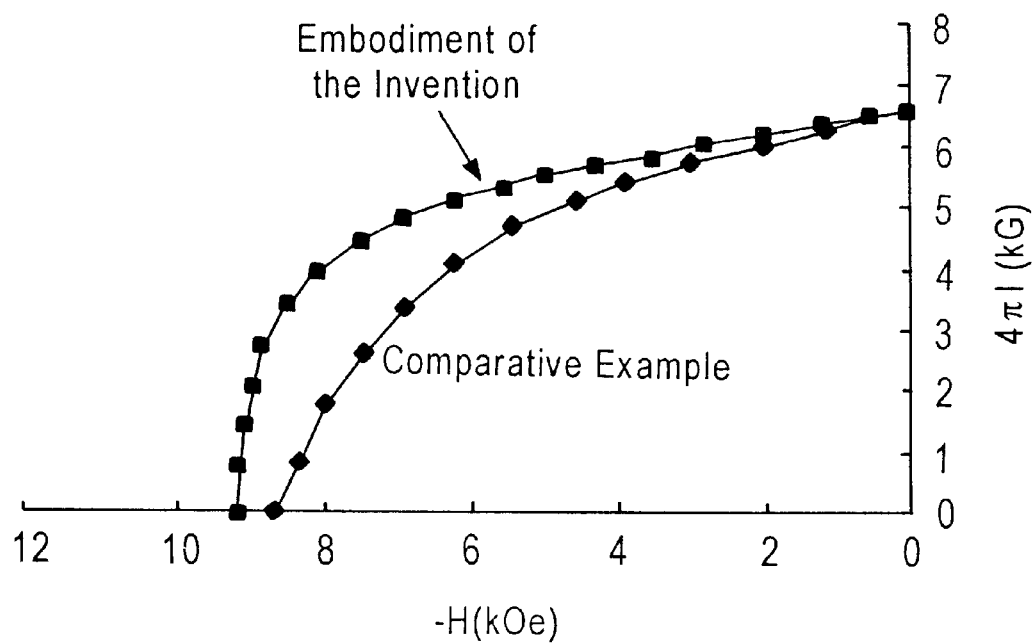
FIG. 6 is a demagnetizing curve showing the flowage improving effect of rare earth resin magnet in the embodiment of the invention and a comparative example.

(c) Effect of flowage improvement of resin magnet composition on magnet motor:

FIG. 6 shows the demagnetizing curve of the magnet rotors using the resin magnet composition containing pentaerythritol C17 triester and resin magnet composition not containing pentaerythritol C17 triester. Each resin magnet composition contains 96 wt.% of rare earth magnetic powder "A" and 4 wt.% of 12-nylon. While the resin magnet composition in pellet form is being heated and compressed, each resin magnet composition is directly charged into the rotor core magnet slot. The rotor core is composed of a plurality of laminated electromagnetic steel plates. In this manner, the magnet rotors are prepared as samples. In FIG. 6, in 100 parts by weight of 12-nylon, 10 parts by weight of pentaerythritol C17 triester is contained. When heating and compressing the resin magnet composition containing rare earth magnetic powder "A", a thin film layer of pentaerythritol C17 triester is formed in the interface of the rotor core and resin magnet composition or rare earth magnetic powder. Accordingly, friction between them is lessened. As a result, pulverization due to grinding of rare earth magnetic powder hardly occurs. Or, if the plate thickness of the laminated electromagnetic steel plates for composing the rotor core is changed from the general thickness of 0.5 mm to 0.35 mm or less, distortion does not take place in the rotor core. Therefore, a magnet rotor having a higher dimensional precision a lower iron loss is obtained.

(d) Effect of improving magnetic field orientation of resin magnet composition containing rare earth magnetic powder:

A sheet-shaped resin magnet intermediate element of 2 mm in thickness was obtained by extrusion molding of a resin magnet composition containing 93 wt.% of rare earth magnetic powder "B1", thermoplastic polyurethane elastomer and pentaerythritol C17 triester. Cutting this sheet-shaped resin magnet intermediate element, the cut-off resin magnet intermediate element was reheated to 220° C. while applying a magnetic field of 15 kOe in the axial direction in the molding die, and cooled and solidified. Thus, a sheet-shaped magnet molded element of 72 mm in length, 4.9 mm in width, and 0.5 mm in thickness was obtained. The percentage of inner voids of this magnet molded element was 2 vol.% or less.

Figure 7:
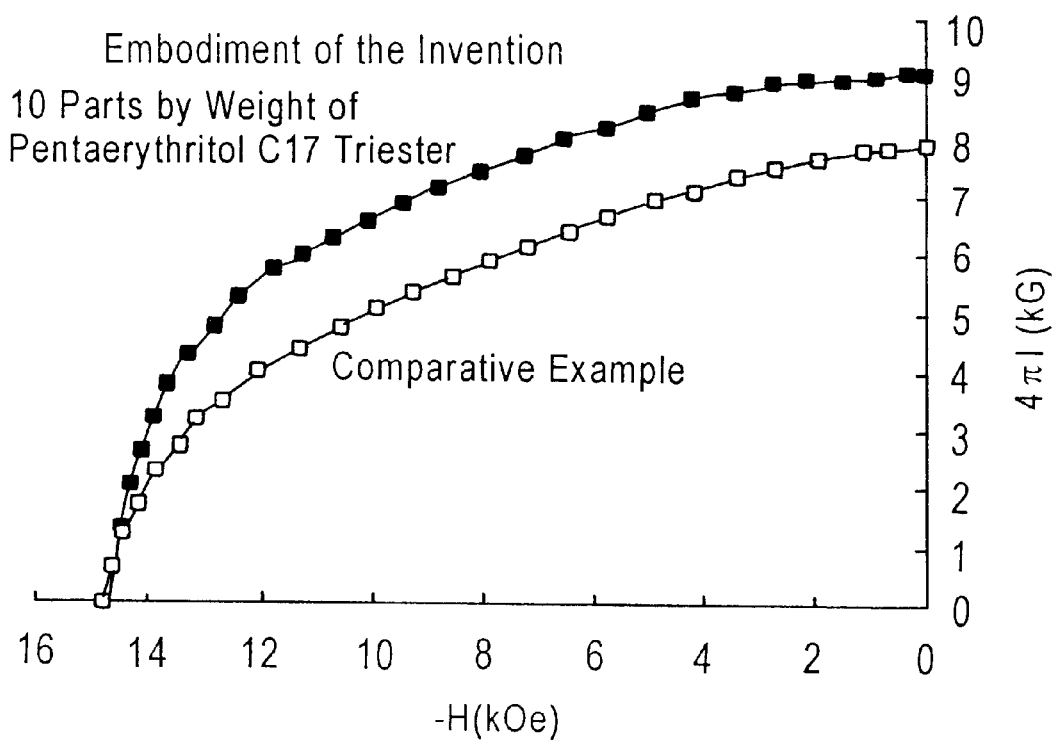
FIG. 7 is a demagnetizing curve showing the magnetic orientation improving effect of rare earth resin magnet in other embodiment of the invention and a comparative example.
Figure 8:
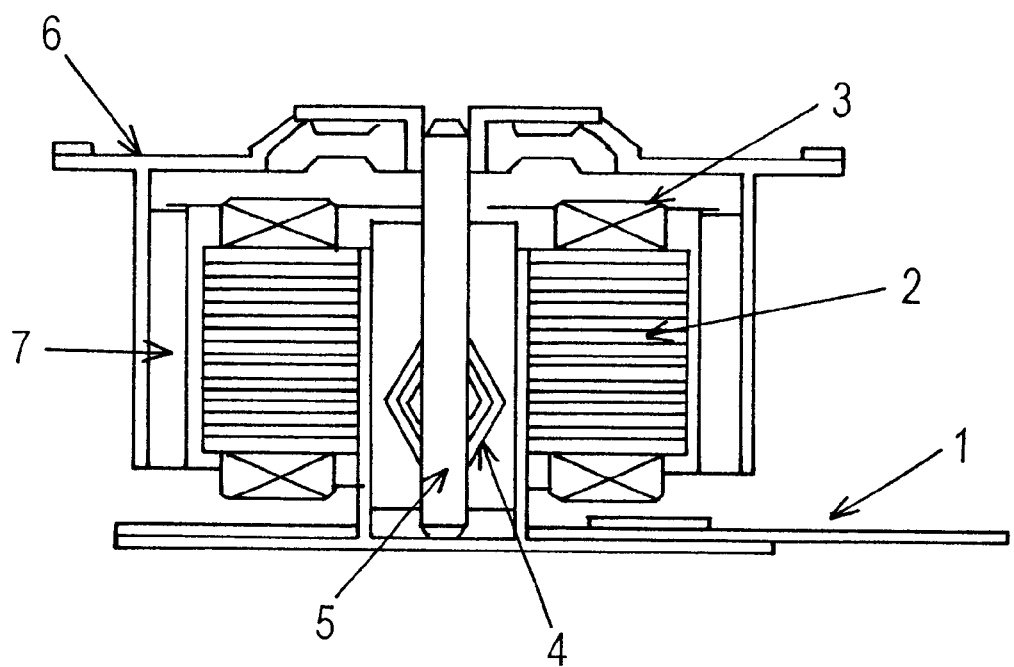
FIG. 8 is a block diagram of a magnet motor using a conventional magnet.

In this magnet molded element, a pulse magnetic field of 50 kOe was applied. FIG. 7 shows the demagnetizing curve of the magnetized magnet molded element at 20° C. As shown in FIG. 7, the maximum energy product [BH] max. of the magnet molded element containing pentaerythritol C17 triester was 18.5 MGOe. By contrast, the maximum energy product [BH] max. of the magnet molded element not containing pentaerythritol C17 triester was 14.2 MGOe. Thus, by the internal activation effect of pentaerythritol stearic acid triester, the degree of orientation of the anisotropic magnetic powder is improved, and hence the magnetic performance such as maximum energy product is enhanced. In the conventional method of improving the degree of orientation of anisotropic magnetic powder, it was general to increase the intensity of magnetic field during orientation of the magnetic powder or lower the melt index of the resin. By contrast, in the embodiment, the degree of orientation is improved remarkably by decreasing the friction between the rare earth magnetic powder and resin by the internal activity of the material containing in the resin magnet composition.

(e) Effect of enhancing motor output by anisotropic rare earth resin magnet:

A sheet-shaped magnet molded element containing 93 wt.% of isotropic rare earth magnetic powder "A" or anisotropic rare earth magnetic powder "B" and pentaerythritol stearic acid triester was curled to a ring shape and disposed in the inner. periphery of a rotor frame with inside diameter of 23 mm. Thus, a motor "A4" having a magnet rotor "A3" having a resin magnet molded element "A2" containing isotropic rare earth magnetic powder "A" as shown in FIG. 1 was fabricated, and also a motor "B4" having a magnet rotor "B3" having a resin magnet molded element "B2" containing anisotropic rare earth magnetic powder "B" was fabricated. A mixture containing 95 wt.% of rare earth magnetic powder "A", epoxy resin, and pentaerythritol stearic acid triester was compressed and molded, and an annular molded element C2 was obtained. The obtained annular molded element "C2" was disposed in the inner periphery of the rotor frame, and a motor "B4" having a magnet rotor "B3" was obtained. In these motors "A4, B4, C4", the starting torque was measured by driving at 12 volts. As a result, the starting torque of the motor "C" was 21.57 mN-m. By contrast, the starting torque of the motor "A4" was 97% of the starting torque of the motor "C". The starting torque of the motor "B4" was 140% of the starting torque of the motor "C".

In the motor having the structure as shown in FIG. 1, when the interval between the annular magnet and rotor frame varies, such fluctuation of the interval may cause vibration. It is, however, an advantage of this embodiment that the sheet-shaped magnet molded element can be curled homogeneously to the rotor frame. Hence, in the same magnetic powder A, if the motor output is equal, the motor using the magnet of the embodiment is silent in rotation. The anisotropic magnet motor using the anisotropic magnetic powder B is further excellent in output.

Thus, the constitution of the invention realizes a rare earth resin magnet having excellent features, such as maximum energy product at 20° C. of 18 MGOe or more, excellent magnetic stability in practical temperature region, and excellent recycling performance. The magnet rotor using such rare earth resin magnet can generate a potent static magnetic field in the space with the armature core. Further, the motor using such magnet rotor is heightened in output and lowered in current consumption.

What is claimed is:

1. A rare earth resin magnet comprising:
    at least one resin of thermoplastic resin and thermoplastic elastomer,
    pentaerythritol stearic acid triester, and
    rare earth magnetic powder,
    wherein said rare earth magnetic powder, resin and pentaerythritol stearic acid triester form a mutually mixed resin magnet composition, and
    said resin magnet composition has a predetermined shape.

2. The rare earth resin magnet of claim 1,
    wherein said pentaerythritol stearic acid triester is contained by 2 parts by weight or more in 100 parts by weight of the resin,
    said rare earth magnetic powder is dispersed in said resin, and oriented in a predetermined direction by magnetic field orientation, and
    said predetermined shape is a shape formed from a hot-processed resin magnet molded element.

3. The rare earth resin magnet of claim 1,
    wherein the number of carbon atoms is 17 or more in the fatty acid residue of said pentaerythritol stearic acid triester compound.

4. The rare earth resin magnet of claim 1,
    wherein said rare earth magnetic powder is a thin piece formed by melt-spun of R—Fe—B molten alloy, R being Nd/Pr.

5. The rare earth resin magnet of claim 1,
    wherein said rare earth magnetic powder includes R—Fe—B (rare earth magnetic powder prepared by at least on method of die upsetting and hydrogen decomposition/recrystallization, R being Nd/Pr.

6. The rare earth resin magnet of claim 4,
    wherein said R—Fe—B rare earth magnetic powder has coercivity HCi of 14 kOe or more at 20° C.

7. The rare earth resin magnet of claim 1,
    wherein said thermoplastic resin is polyamide-12, and
    the content of said rare earth magnetic powder contained in said resin magnet composition is 96 wt. % at maximum.

8. The rare earth resin magnet of claim 1, wherein said thermoplastic elastomer is perfect thermoplastic polyurethane elastomer, and the content of said rare earth magnetic powder contained in said resin magnet composition is 94 wt. % at maximum.

9. A magnet rotor comprising:

the rare earth resin magnet of claim 1, and a rotor frame, wherein said rare earth resin magnet has a ring shape, said rare earth resin magnet of the ring shape is disposed in the inner periphery of said rotor frame, and said rare earth resin magnet of the ring shape is a curled molded element of the sheet-shaped rare earth resin magnet formed from the resin magnet composition.

10. The magnet rotor of claim 9, wherein said rare earth resin magnet of the ring shape is a molded element molded by injecting or extruding the resin magnet composition right directly to the rotor frame.

11. A magnet motor comprising:

the rare earth resin magnet of claim 1, a rotor frame, an armature core, a winding, and a rotor, wherein said rare earth resin magnet has a ring shape, and said rare earth resin magnet of the ring shape is installed in the inner periphery of said rotor frame.

12. The magnet motor of claim 11, wherein said rare earth resin magnet of the ring shape is a curled molded element of the sheet-shaped rare earth resin magnet formed from the resin magnet composition.

13. The magnet motor of claim 11, wherein said rare earth. resin magnet of the ring shape is a molded element molded by injecting or extruding the resin magnet composition right directly to the rotor frame.

14. A manufacturing method of rare earth resin magnet comprising the steps of:

(a) forming a mixture containing at least one resin of thermoplastic resin and elastomer, rare earth magnetic powder, and pentaerythritol stearic acid triester, and (b) forming a resin magnet molded element having a predetermined shape from said mixture.

15. The manufacturing method of rare earth resin magnet of claim 14, wherein said step (b) includes a step of forming an annular resin magnet molded element from said mixture.

16. The manufacturing method of rare earth resin magnet of claim 14, wherein said step (b) includes a step of forming a flexible sheet-shaped bonded magnet from said mixture, a step of forming a resin magnet intermediate element from said flexible sheet-shaped bonded magnet, and a step of forming an annular resin magnet molded element by curling said resin magnet intermediate element.

17. The manufacturing method of rare earth resin magnet of claim 16, wherein said step of forming the resin magnet intermediate element includes a step of melting and solidifying said flexible sheet-shaped bonded magnet while applying a magnetic field in a molding die.

18. The manufacturing method of rare earth resin magnet of claim 14, wherein said step (b) includes a step of forming the resin magnet molded element having a predetermined shape directly from said mixture.

19. The manufacturing method of rare earth resin magnet of claim 14, wherein said pentaerythritol stearic acid triester is contained by 2 parts by weight or more in 100 parts by weight of the resin.

20. The manufacturing method of rare earth-resin magnet of claim 14, wherein said step (b) includes a step of heating said mixture while applying a magnetic field to the mixture, and cooling, and thereby said rare earth magnetic powder contained in said resin magnet molded element is dispersed in said resin, and is oriented in a predetermined direction.

21. The manufacturing method of rare earth resin magnet of claim 14, wherein said pentaerythritol stearic acid triester is contained by 2 parts by weight or more in 100 parts by weight of the resin, and said step (b) includes a step of heating said mixture while applying a magnetic field to the mixture, and cooling, thereby said rare earth magnetic powder contained in said resin magnet molded element is dispersed in said resin, and is oriented in a predetermined direction.

* * * * *